United States Patent
Wang

(10) Patent No.: US 10,962,397 B2
(45) Date of Patent: Mar. 30, 2021

(54) METHOD FOR PRESSURE MEASUREMENT USING A CORIOLIS MASS FLOWMETER AND CORIOLIS MASS FLOWMETER

(71) Applicant: KROHNE AG, Basel (CH)

(72) Inventor: Tao Wang, Canterburry (GB)

(73) Assignee: KROHNE AG, Basel (CH)

( * ) Notice: Subject to any disclaimer, the term of this patent is extended or adjusted under 35 U.S.C. 154(b) by 341 days.

(21) Appl. No.: 15/888,296

(22) Filed: Feb. 5, 2018

(65) Prior Publication Data
US 2018/0224310 A1 Aug. 9, 2018

(30) Foreign Application Priority Data
Feb. 8, 2017 (DE) .................... 10 2017 102 449.2

(51) Int. Cl.
*G01F 1/84* (2006.01)
*G01F 15/02* (2006.01)

(52) U.S. Cl.
CPC ............ *G01F 1/8436* (2013.01); *G01F 1/849* (2013.01); *G01F 1/8427* (2013.01); *G01F 15/022* (2013.01)

(58) Field of Classification Search
CPC ...... G01F 1/8436; G01F 15/022; G01F 1/849; G01F 1/8427; G01F 15/02; G01F 1/845; G01F 1/84
See application file for complete search history.

(56) References Cited

U.S. PATENT DOCUMENTS

| | | |
|---|---|---|
| 5,473,949 A | 12/1995 | Cage et al. |
| 5,827,979 A | 10/1998 | Schott et al. |
| 6,732,570 B2 | 5/2004 | Francisco, Jr. |
| 6,868,740 B2 * | 3/2005 | Hussain ................ G01F 1/8431 73/861.356 |
| 7,318,356 B2 | 1/2008 | Kolahi et al. |
| 8,763,443 B2 | 7/2014 | Hussain et al. |
| 9,322,759 B2 | 4/2016 | Yan et al. |
| 2003/0200816 A1 | 10/2003 | Francisco, Jr. |

(Continued)

FOREIGN PATENT DOCUMENTS

DE 1669727 * 6/2005 ............... G01F 1/84

OTHER PUBLICATIONS

Machine Translation of EP 1669727, 2005.*
Too Wong, Large Size Straight-tube Coriolis Flowmeters, Measurement + Control vol. 44/Feb. 1, 2011 , pp. 25-27.*

*Primary Examiner* — Alexander Satanovsky
(74) *Attorney, Agent, or Firm* — David S. Safran; Roberts Calderon Safran & Cole, P.C.

(57) ABSTRACT

A method for pressure measurement using a Coriolis mass flowmeter. A temperature sensor measures the temperature of the measuring tube and forwards a measured temperature value to a control and evaluation unit. A tension sensor measures the mechanical tension of the measuring tube in the axial direction and/or in the circumferential direction and forwards a measured axial and/or circumferential tension value to the control and evaluation unit. The pressure of the medium is determined based on the measured temperature value and at least one measured tension value. The pressure value within the measuring tube is determined using an algorithm that takes into account the difference between the measured temperature value and a reference measured value and between at least one measured tension value and reference measured values.

7 Claims, 2 Drawing Sheets

(56) References Cited

U.S. PATENT DOCUMENTS

2008/0302169 A1* 12/2008 Patten .................. G01F 1/8436
73/1.35
2010/0326204 A1* 12/2010 Wang ................... G01F 1/8436
73/861.355
2019/0316944 A1* 10/2019 Keeney-Ritchie ...........................
G01F 25/0007

* cited by examiner

METHOD FOR PRESSURE MEASUREMENT USING A CORIOLIS MASS FLOWMETER AND CORIOLIS MASS FLOWMETER

BACKGROUND OF THE INVENTION

Field of the Invention

The invention relates to a method for pressure measurement using a Coriolis mass flowmeter, wherein the Coriolis mass flowmeter has at least one measuring tube, at least one oscillation generator, at least two oscillation sensors, at least one temperature sensor, at least one tension sensor, at least one display unit and at least one control and evaluation unit, wherein the measuring tube has medium flowing through it, wherein the temperature sensor is arranged such that it measures the temperature of the measuring tube and forwards it as a measured temperature value T to the control and evaluation unit, wherein the tension sensor is designed and arranged such that the tension sensor measures the mechanical tension of the measuring tube in the axial direction and/or in the circumferential direction and forwards a measured axial tension value $S_a$ and/or a measured tension value $S_h$ of the circumferential direction to the control and evaluation unit and wherein the pressure of the medium is determined based on the measured temperature value T and at least one measured tension value $S_a$ and/or $S_h$.

Additionally, the invention also relates to a Coriolis mass flowmeter comprising at least one measuring tube, at least one oscillation generator, at least two oscillation sensors, at least one temperature sensor, at least one tension sensor, at least one display unit and at least one control and evaluation unit, wherein the measuring tube can have medium flowing through it, wherein the temperature sensor is designed and arranged such that it measures the temperature of the measuring tube and forwards it as measured temperature value T to the control and evaluation unit, wherein the tension sensor is designed and arranged such that the tension sensor measures the mechanical tension of the measuring tube in the axial direction and/or in the circumferential direction and forwards a measured axial tension value $S_a$ and/or a measured tension value $S_h$ of the circumferential direction to the control and evaluation unit and the control and evaluation unit is designed such that it determines the pressure of the medium based on the measured temperature value T and/or at least one measured tension value $S_a$ and/or $S_h$.

Description of Related Art

It is known from the prior art that not only the mass flow of a medium that is flowing through a measuring tube can be measured using a Coriolis mass flowmeter, but also further variables, such as the density of the medium or also the pressure of the medium. For the measurement of the pressure within the measuring tube, it is taken advantage of that a pressure change in the measuring tube is the result of a change in circumference of the measuring tube.

The German Patent Application DE 102 56 376 A1 and corresponding to U.S. Pat. No. 6,868,740 B2 disclose a method for pressure measurement using a Coriolis mass flowmeter, wherein the Coriolis mass flowmeter has a tension sensor that measures the mechanical tension of the measuring tube and wherein the pressure in the measuring tube is determined on the basis of the determined tension. In particular, a strain gauge is provided as tension sensor, which is attached to the measuring tube in the circumferential direction. Additionally, a further strain gauge that is attached in the axial direction and a temperature sensor that measures the temperature of the measuring tube are provided. By additionally providing the temperature sensor, measurement errors based on temperature changes can be corrected. Thereby, the pressure is determined either on the basis of a theoretically determined relationship between the pressure and the change in circumference of the measuring tube with a precise, predetermined geometry or using an empirically determined pair of values of pressure, tension or an empirical function. According to one design, one strain gauge is arranged in the circumferential direction and one strain gauge in the axial direction on the measuring tube, wherein the strain gauges are integrated in a Wheatstone bridge.

A Coriolis mass flowmeter is also known from U.S. Pat. No. 6,732,570 B2, wherein strain gauges for measuring the mechanical tension are arranged on the measuring tube, which are oriented both axially as well as in the circumferential direction. The strain gauges are also integrated into a Wheatstone bridge. The pressure prevailing in the measuring tube is determined depending on the measured tension value.

The above described method for determining the pressure within the measuring tube, however, is essentially based on determining the pressure on the basis of an empirically determined correlation or using the direct comparison of the differently oriented strain gauges, for example, the arrangement in a Wheatstone bridge.

SUMMARY OF THE INVENTION

Based on the prior art described above, the object of the invention is to provide a method for pressure measurement using a Coriolis mass flowmeter, with which the pressure within the measuring tube can be particularly easy to measure.

According to a first teaching, this object is achieved using a method described in the introduction, in that the determination of the pressure value within the measuring tube based on a pressure $p_0$ is carried out using an algorithm, wherein $p_0$ is recorded under reference conditions and that, furthermore, the algorithm takes into account the difference between the measured temperature value T and the reference measured value $T_0$ and between at least one tension measured value $S_a$ and/or $S_h$ and reference measured values $S_{a0}$ and/or $S_{h0}$, wherein the reference measured values $T_0$ and/or $S_{a0}$ and/or $S_{h0}$ were measured under reference conditions and that the pressure value determined using the algorithm is issued via the display unit.

According to the invention, it has been recognized that the determination of the pressure inside the measuring tube can be carried out particularly easily in that the change of the relevant measured variables T, $S_h$ and/or $S_a$ are determined based on a known pressure $p_0$ and known reference measured values $T_0$, $S_{h0}$ and/or $S_{a0}$. If only these changes are implemented into the algorithm for determining the pressure value, then the algorithm for determining the pressure is particularly simple and, in particular, particularly simple to implement. Thus, the method has, overall, the advantage that the pressure measurement is particularly simple to carry out in comparison to the method known from the prior art.

According to an advantageous design for measuring the mechanical tension of the measuring tube, the tension sensor comprises one strain gauge that is arranged in the circumferential direction on the measuring tube and measures the mechanical tension in the circumferential direction, and one strain gauge that is arranged in the axial direction on the measuring tube and measures the mechanical tension in the axial direction.

It is additionally advantageous when the determination of the pressure is carried out in real time within the measuring tube and is issued in real time via the display unit. Thereby, the term "in real time" means that the temporal delay of issuing the pressure of the medium within the measuring tube and the determination of the measured temperature and measured tension values comprise only technically caused delays in the processing and forwarding of data. Thus, this design has the advantage that the user is continually informed of the pressure prevailing in the measuring tube.

According to a further design, the pressure determined using the algorithm is compared to a previously determined threshold value and a signal is issued when the pressure exceeds an upper threshold value or falls below a lower threshold value. If the pressure exceeds an upper threshold value or if the pressure falls below a lower threshold value, then further measures are taken to eliminate the cause of the exceedance or shortfall of the threshold value.

According to a further advantageous design, the mass flow of the medium is determined essentially simultaneously with the pressure measurement and the measured mass flow is corrected using the measured pressure value. This design is particularly advantageous since the error of mass flow pressure measurement is particularly small.

According to a further advantageous design, the reference conditions describe the state of the measuring tube in which there is no medium flowing through the measuring tube. Alternatively, the reference measured values are also recorded at the beginning of each measurement, so that the reference conditions are then provided when a medium is flowing through the measuring tube and measurement is started.

According to a further preferred design of the method, the difference $\Delta T$ between the measured temperature value T and the reference measured value $T_0$ are linearly or quadratically implemented into the pressure measurement within the medium. In particular, the non-linear consideration of the temperature difference leads to pressure values that have a particularly small error.

Furthermore, it is preferred when the difference $\Delta S_h$ between the measured tension value $S_h$ and the reference measured value $S_{h0}$ and/or the difference $\Delta S_a$ between the measured tension value $S_a$ and the reference measured value $S_{a0}$ are linearly implemented into the pressure measurement within the medium.

According to a further preferred design, the pressure is determined according to the following formula:

$$p=p_0+c_1\Delta T+c_2\Delta S_h,$$

with $\Delta T=T-T_0$ and $\Delta S_h=S_h-S_{h0}$ and wherein $c_1$ and $c_2$ are proportionality factors that can be determined in the scope of a regression. The pressure measurement according to this design is particularly simple and involves very little calculating effort. However, the axial mechanical tension is not thereby taken into account.

In an alternative design of the method, the pressure is determined according to the following formula:

$$p=p_0+c_1\Delta T+c_2\Delta S_h+c_3\Delta S_a,$$

with $\Delta T=T-T_0$ and $\Delta S_h=S_h-S_{h0}$ and $\Delta S_a=S_a-S_{a0}$, and wherein $c_1$, $c_2$ and $c_3$ are proportionality factors that can be determined in the scope of a regression. The pressure measurement according to this design is particularly simple and involves very little calculating effort, wherein both the mechanical tension in the circumferential direction as well as the axial mechanical tension are taken into account.

In an alternative design, the pressure is determined according to the following formula:

$$p=p_0+c_1\Delta T+c_2\Delta S_h+c_4\Delta T^2,$$

with $\Delta T=T-T_0$ and $\Delta S_h=S_h-S_{h0}$, and wherein $c_1$, $c_2$ and $c_4$ are proportionality factors that can be determined in the scope of a regression. The pressure measurement is also particularly simple according to this design and involves very little calculating effort. The pressure measurement is optimized to the effect that the temperature difference is entered both linearly as well as quadratically. This results in a particularly small error of the pressure measurement.

In an alternative design, the pressure is determined according to the following formula:

$$p=p_0+c_1\Delta T+c_2\Delta S_h+c_3\Delta S_a+c_4\Delta T^2,$$

with $\Delta T=T-T_0$ and $\Delta S_h=S_h-S_{h0}$ and $\Delta S_a=S_a-S_{a0}$, and wherein $c_1$, $c_2$, $c_3$ and $c_4$ are proportionality factors that can be determined in the scope of a regression. The pressure measurement according to this design is particularly advantageous, since the temperature difference is implemented both linearly and quadratically in the pressure measurement and, furthermore, both the mechanical tension in the circumferential direction as well as the axial mechanical tension of the measuring tube are taken into account. This consideration of the parameter according to the above-described correlation results in a particularly small error of the pressure measurement.

According to a particularly preferred design, the Coriolis mass flowmeter carries out the above-described method during operation.

In detail, there is a plurality of possibilities for designing and further developing the method according to the invention and the Coriolis mass flowmeter according to the invention. Reference is made to both the patent claims subordinate to the independent patent claims as well as to the following description of preferred embodiments in conjunction with the drawing. The drawing shows:

DETAILED DESCRIPTION OF THE INVENTION

Figure 1:
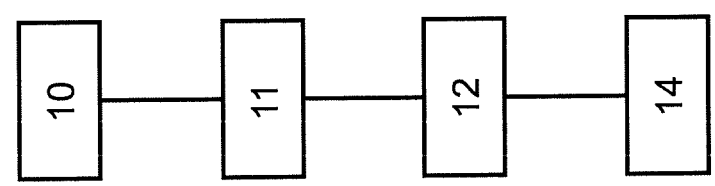
FIG. 1 is a first embodiment of a method for pressure measurement using a Coriolis mass flowmeter.
Figure 5:
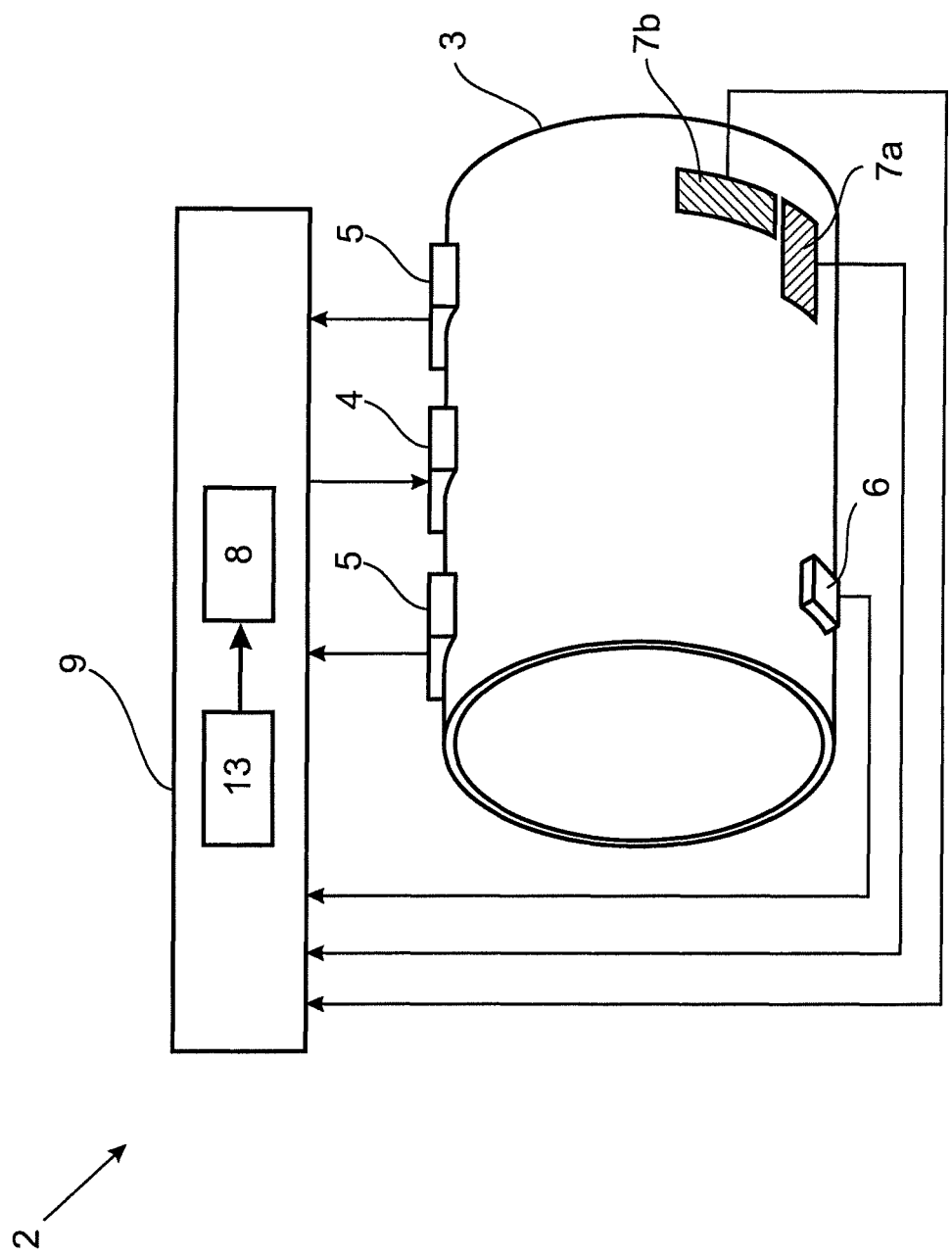

FIG. 1 shows a first embodiment of a method 1 for pressure measurement using a Coriolis mass flowmeter 2, wherein the Coriolis mass flowmeter 2, as shown, for example. in FIG. 5, has the following components: a measuring tube 3, an oscillation generator 4, two oscillation sensors 5, a temperature sensor 6, at least one tension sensor 7, at least one display unit 8 and at least one control and evaluation unit 9, wherein the measuring tube 3 has medium flowing through it during operation, wherein the temperature sensor 6 is arranged such that it measures the temperature of the measuring tube 3 and forwards it as a measured temperature value T to the control and evaluation unit 9, wherein the tension sensor 7 is designed and arranged such that the tension sensor 7 measures the mechanical tension of the measuring tube 3 in the circumferential direction and forwards a measured tension value $S_h$ of the circumferential direction to the control and evaluation unit 9.

In the embodiment shown in FIG. 5, the tension sensor 7 comprises a strain gauge 7a that is arranged in the axial direction of the measuring tube 3 and a strain gauge 7b that is arranged in the circumferential direction of the measuring tube 3. However, for the method shown in FIG. 1, only the strain gauge 7b arranged in the circumferential direction of the measuring tube 3 is needed.

The strain gauges 7a, 7b can also be attached at other positions on the measuring tube 3, for example, at a more central position in respect to the ends of the measuring tube 3. The same holds true for the position of the temperature sensor 6.

In a first step 10 of the method 1 shown in FIG. 1, the pressure $p_0$, the temperature $T_0$ of the measuring tube 3 and the mechanical tension $S_{h0}$ in the circumferential direction are measured under reference conditions. Subsequently, the measuring tube 3 has the medium to be measured flowing through it.

In the next step 11, the temperature T of the measuring tube 3 and the mechanical tension $S_h$ are determined.

In a subsequent step 12, the pressure 13 is determined according to the following relation: $p=p_0+c_1\Delta T+c_2\Delta S_h$.

Finally, the pressure 13 is transmitted to and issued by the display unit 8 in step 14.

Figure 2:
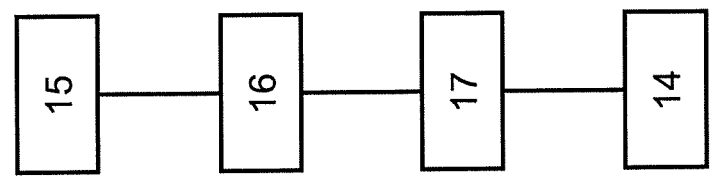
FIG. 2 is a second embodiment of a method for pressure measurement using a Coriolis mass flowmeter.

In FIG. 2, a second embodiment of a method 1 for pressure measurement using a Coriolis mass flowmeter 2 is shown, wherein the Coriolis mass flowmeter 3 is as it is shown, for example, in FIG. 5 and described above. As opposed to the method described in FIG. 1, the method described in FIG. 2 requires both the tension value $S_a$ in the axial direction as well as the tension value $S_h$ of the circumferential direction of the measuring tube 3.

In a first step 15 of the method shown in FIG. 2, the pressure $p_0$, the temperature $T_0$ of the measuring tube 3, the mechanical tension $S_{a0}$ in the axial direction and the mechanical tension $S_{h0}$ in the circumferential direction are measured under reference conditions. Subsequently, the measuring tube 3 has the medium to be measured flowing through it.

In a next step 16, the temperature T of the measuring tube 3, the mechanical tension $S_h$ and the mechanical tension $S_a$ are measured.

In a subsequent step 17, the pressure 13 is determined according to the following relation: $p=p_0+c_1\Delta T+c_2\Delta S_h+c_3\Delta S_a$.

Finally, the pressure 13 is transmitted to and issued by the display unit 8 in step 14.

Figure 3:
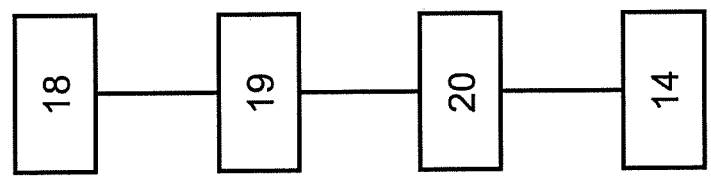
FIG. 3 is a third embodiment of a method for pressure measurement using a Coriolis mass flowmeter.

In FIG. 3, a third embodiment of a method 1 for pressure measurement using a Coriolis mass flowmeter 2 is shown, wherein the Coriolis mass flowmeter 3 is as it is shown, for example, in FIG. 5 and described above. As in the method shown in FIG. 1, only the value of the mechanical tension $S_h$ in the circumferential direction is required.

In a first step 18 of the method 1 shown in FIG. 3, the pressure $p_0$, the temperature $T_0$ of the measuring tube 3, and the mechanical tension $S_{h0}$ in the circumferential direction are measured under reference conditions. Subsequently, the measuring tube 3 has the medium to be measured flowing through it.

In a next step 19, the temperature T of the measuring tube 3 and the mechanical tension $S_h$ are measured.

In a subsequent step 20, the pressure 13 is determined according to the following relation: $p=p_0+c_1\Delta T+c_2\Delta S_h+c_4\Delta T^2$.

Finally, the pressure 13 is transmitted to and issued by the display unit 8 in step 14.

Figure 4:
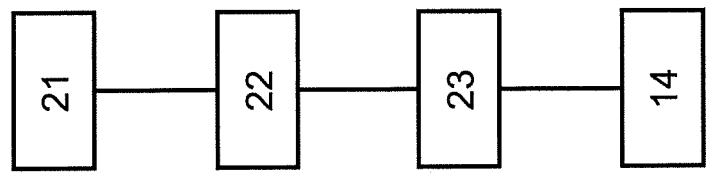
FIG. 4 is a fourth embodiment of a method for pressure measurement using a Coriolis mass flowmeter and FIG. 5 is a first embodiment of a Coriolis mass flowmeter according to the invention.

A fourth embodiment of a method 1 for pressure measurement using a Coriolis mass flowmeter 2 is shown in FIG. 4, wherein the Coriolis mass flowmeter 3 is as it is shown, for example, in FIG. 5 and described above.

In a first step 21 of the method shown in FIG. 4, the pressure $p_0$, the temperature $T_0$ of the measuring tube 3, the mechanical tension $S_{a0}$ in the axial direction and the mechanical tension $S_{h0}$ in the circumferential direction are measured under reference conditions. Subsequently, the measuring tube 3 has the medium to be measured flowing through it.

In a next step 22, the temperature T of the measuring tube 3, the mechanical tension $S_a$ and the mechanical tension $S_h$ are measured.

In a subsequent step 23, the pressure 13 is determined according to the following relation: $p=p_0+c_1\Delta T+c_2\Delta S_h+c_3\Delta S_a+c_4\Delta T^2$.

Finally, the pressure 13 is transmitted to and issued by the display unit 8 in step 14.

What is claimed is:

1. A method for pressure measurement using a Coriolis mass flowmeter that has at least one measuring tube, at least one oscillation generator, at least two oscillation sensors, at least one temperature sensor, at least one tension sensor, at least one display unit and at least one control and evaluation unit, wherein the measuring tube has medium flowing through it, wherein the temperature sensor is arranged such that it measures the temperature of the measuring tube and forwards it as a measured temperature value T to the control and evaluation unit, wherein the tension sensor is configured and arranged such that the tension sensor measures the mechanical tension of the measuring tube in an axial direction and in a circumferential direction and forwards a measured axial tension value $S_a$ and a measured tension value $S_h$ of the circumferential direction to the control and evaluation unit, the method comprising the steps of:
measuring the temperature value T with the temperature sensor,
measuring a reference temperature $T_0$ under reference conditions,
measuring a tension value $S_a$ and $S_h$,
measuring reference tension values $S_{a0}$ and $S_{h0}$ under reference conditions,
recording a pressure $p_0$ under reference conditions,
determining a pressure value within the measuring tube based on the pressure $p_0$ using an algorithm, and
wherein the algorithm takes into account the difference between the measured temperature value T and the reference temperature value $T_0$ and between the measured tension values $S_a$ and $S_h$ and reference tension values $S_{a0}$ and $S_{h0}$, and
issuing the pressure value determined by means of the algorithm via the at least one display unit,
wherein a difference $\Delta T$ between the measured temperature value T and the reference measured value $T_0$ is linearly and/or quadratically implemented into an algorithm for determining the pressure of the medium and wherein a difference $\Delta S_h$ between the measured tension value $S_h$ and the reference measured value $S_{h0}$ and the difference $\Delta S_a$ between the measured tension value $S_a$ and the reference measured value $S_{a0}$ is linearly and/or quadratically implemented into the algorithm for determining the pressure of the medium.

2. The method according to claim 1, wherein the reference conditions comprise the state of the measuring tube in which no medium is flowing through the measuring tube.

3. The method according to claim 1, wherein the algorithm for determining the pressure of the medium is comprised of the following formula:

$$p=p_0+c_1\Delta T+c_2\Delta S_h,$$

with $\Delta T=T-T_0$ and $\Delta S_h=S_h-S_{h0}$ and wherein $c_1$ and $c_2$ are proportionality factors that determined in the scope of a regression and p and $p_0$ are pressure values, p being the pressure of the medium measured inside the measuring tube and $p_0$ being a known pressure.

4. The method according to claim 1, wherein the algorithm is comprised of the following formula:

$$p=p_0+c_1\Delta T+c_2\Delta S_h+c_3\Delta S_a,$$

with $\Delta T=T-T_0$ and $\Delta S_h=S_h-S_{h0}$ and $\Delta S_a=S_a-S_{a0}$, and wherein $c_1$, $c_2$ and $c_3$ are proportionality factors are determined in the scope of a regression and p and $p_0$ are pressure values, p being the pressure of the medium measured inside the measuring tube and $p_0$ being a known pressure.

5. The method according to claim 1, wherein the algorithm is comprised of the following formula:

$$p=p_0+c_1\Delta T+c_2\Delta S_h+c_4\Delta T^2,$$

with $\Delta T=T-T_0$ and $\Delta S_h=S_h-S_{h0}$, and wherein $c_1$, $c_2$ and $c_4$ are proportionality factors that are determined in the scope of a regression and p and $p_0$ are pressure values, p being the pressure of the medium measured inside the measuring tube and $p_0$ being a known pressure.

6. The method according to claim 1, wherein the algorithm is comprised of the following formula:

$$p=p_0+c_1\Delta T+c_2\Delta S_h+c_3\Delta S_a+c_4\Delta T^2,$$

with $\Delta T=T-T_0$ and $\Delta S_h=S_h-S_{h0}$ and $\Delta S_a=S_a-S_{a0}$, and wherein $c_1$, $c_2$, $c_3$ and $c_4$ are proportionality factors are determined in the scope of a regression and p and $p_0$ are pressure values, p being the pressure of the medium measured inside the measuring tube and $p_0$ being a known pressure.

7. A Coriolis mass flowmeter, comprising:

at least one measuring tube through which a medium is flowable, at least one oscillation generator, at least two oscillation sensors, at least one temperature sensor, at least one tension sensor, at least one display unit, and at least one control and evaluation unit, wherein the temperature sensor is configured and arranged for measuring temperature of the measuring tube and for forwarding a measured temperature value T to the control and evaluation unit, wherein the tension sensor is configured and arranged for measuring mechanical tension of the measuring tube in an axial direction and in a circumferential direction and for forwarding a measured axial tension value $S_a$ and a measured circumferential tension value $S_h$ to the control and evaluation unit, wherein the control and evaluation unit is adapted for determining pressure of the medium based on at least one of the measured temperature value T or at least the measured tension values $S_a$ and $S_h$, wherein the control and evaluation unit is adapted for determining pressure within the measuring tube based on a reference pressure $p_0$ using an algorithm that algorithm takes into account a difference between the measured temperature value T and the reference measured value $T_0$ and between the measured tension values $S_a$ and $S_h$ and the reference values $S_{a0}$ and $S_{h0}$, wherein the reference measured values $T_0$ and/or $S_{a0}$ and/or $S_{h0}$ were measured under reference conditions, wherein the control and evaluation unit is connected to a display device for displaying the pressure value determined, wherein the difference $\Delta T$ between the measured temperature value T and the reference measured value $T_0$ is linearly and/or quadratically implemented into the algorithm for determining the pressure of the medium and wherein the difference $\Delta S_h$ between the measured tension value $S_h$ and the reference measured value $S_{h0}$ and the difference $\Delta S_a$ between the measured tension value $S_a$ and the reference measured value $S_{a0}$ is linearly and/or quadratically implemented into the algorithm for determining the pressure of the medium.

* * * * *